United States Patent [19]

Deuschel et al.

[11] 3,957,744
[45] May 18, 1976

[54] POLYMERIZATION OF VINYL CHLORIDE IN AQUEOUS SUSPENSION

[75] Inventors: Walter Deuschel, Mannheim; Erich Gulbins, Heidelberg; Alfred Hauss; Dietrich Lausberg, both of Ludwigshafen; Wilhelm Sigmund, Heidelberg, all of Germany

[73] Assignee: Badische Anilin- & Soda-Fabrik Aktiengesellschaft, Ludwigshafen, Germany

[22] Filed: Mar. 15, 1973

[21] Appl. No.: 341,452

[30] Foreign Application Priority Data

Mar. 17, 1972 Germany............................ 2212962

[52] U.S. Cl.................................. 526/73; 526/200; 526/219; 526/227; 526/229; 526/345; 526/344
[51] Int. Cl.².................... C08F 1/60; C08F 1/78; C08F 3/30; C08F 15/28
[58] Field of Search............ 260/92.8, 92.8 W, 85.7, 260/87.5 C, 87.7, 87.1

[56] References Cited

UNITED STATES PATENTS

| | | | |
|---|---|---|---|
| 3,375,238 | 3/1968 | Bauer................................. | 260/92.8 |
| 3,578,649 | 5/1971 | Badguerahanian............ | 260/92.8 W |
| 3,652,526 | 3/1972 | Bourget............................. | 260/92.8 |

*Primary Examiner*—Christopher A. Henderson
*Attorney, Agent, or Firm*—Johnston, Keil, Thompson & Shurtleff

[57] ABSTRACT

Polymerization of vinyl chloride in aqueous suspension in the presence of free-radical initiators of short half-life at pH's below 8. The temperature of the reactor wall must not be more than 20°C above the temperature of the polymerization mixture during the heat-up phase and it must be lower than the temperature of the polymerization mixture during the subsequent polymerization phase. This procedure suppresses the formation of incrustations in the reactor.

8 Claims, No Drawings

POLYMERIZATION OF VINYL CHLORIDE IN AQUEOUS SUSPENSION

This invention relates to a process for the polymerization of vinyl chloride in aqueous suspension in which the formation of incrustations in the reactor is suppressed.

In conventional batchwise suspension polymerizations of vinyl choride in stirred autoclaves, incrustations or paperlike coatings of polyvinyl chloride form on the inside of the reactor walls and on the fittings in the reactor. Thus it is necessary to open and clean the reaction after each polymerization cycle.

It is an object of the present invention to provide a process in which the formation of such coatings is suppressed.

We have found, surprisingly, that incrustation takes place during the heat-up phase prior to polymerization and may be suppressed by complying with the following three conditions during this phase:

a. the use of free-radical initiators having a half-life at 50°C of less than 10 hours,
b. maintaining the polymerization mixture at a pH of less than 8 and preferably between 7 and 3 during the heat-up phase, and
c. maintaining the temperature of the reactor wall at not more than 20°C and preferably not more than 15°C above the temperature of the polymerization mixture during the heat-up phase, which constitutes not more than one third of the total polymerization cycle, and maintaining the temperature of the reactor wall at a lower value than that of the polymerization mixture during the polymerization phase.

The explanation for the effect of these measures may be that they cause rapid graft polymerization of the monomers onto the macromolecular protective colloids contained in the polymerization mixture. Detailed analytical tests have shown that incrustation does not occur if during the heat-up phase of the polymerization at least 30% by weight of the monomers, based on the total weight of the protective colloid present, are grafted onto said protective colloid. The grafted protective colloid remains evenly distributed throughout the polymerization mixture, whereas they tend to settle on the walls of the reactor to form incrustations thereon if the degree of grafting is too low or the temperature differential between the reactor walls and the polymerization mixture is too large.

Our process serves to prepared polymers of vinyl chloride, preferably polyvinyl chloride. However, it is also useful for copolymerizing vinyl chloride with up to 30% by weight of conventional comonomers such as vinyl acetate, vinyl propionate, vinylidene chloride, ethylene and propylene. In principle, it is suitable for any suspension polymerization of monomers or monomer mixtures of which the polymers are insoluble in monomer.

The polymerization is carried out in aqueous suspension, the ratio of monomer to water preferably varying from 70:30 to 25:75. The choice of ratio of these two phases is determined by the desired physical properties of the suspension polymer to be produced. If, for example, plasticizers or elastomers are included in large quantities to modify the polymer, the suspension polymerization being carried out in their presence, the weight of monomer used in relation to the water in which it is suspended will be reduced according to the volume of modifying agents used. During polymerization, more water may be added to the mixture according to the reduction in volume taking place during the reaction, which added water is preferably colder than the polymerization mixture.

The suspension stabilizers used are conventional macromolecular protective colloids which are soluble in water, in particular cellulose ethers, mixed cellulose ehters, partially saponified polyvinyl acetates and copolymers thereof, polyvnyl pyrrolidone and copolymers thereof, gelatin and mixtures of said colloids. To improve their dispersibility, said colloids may be used in conjunction with neutral or non-ionic surfactants.

The protective colloids are preferably added at the commencement of polymerization in the form of solutions or dispersions in at least part of the suspension water, which is preferably not preheated. It is possible, however, to add the protective colloids and also other auxiliaries such as initiators, surfactants and antifoaming and anti-incrustation additives to the polymerization mixture during polymerization either continuously or intermittently.

Polymerization is carried out in conventional reactors. We prefer to use stirred autoclaves which may be heated or cooled by means of Water flowing through the jacket. The heat of polymerization may be removed by evaporative cooling in addition to the jacket cooling. The polymerization mixture is agitated by usual stirring systems, for example anchor agitators or impellers. The stirring speed is preferably between 50 and 200 r.p.m. During the heat-up period or until a conversion of 15% w/w of the monomers present is reached, the stirring speed may be much lower, preferably in the range 0 to 10 r.p.m. Convenient reactors are stainless steel autoclaves or enameled steel autoclaves.

The free-radical initiators used in the polymerization should decompose rapidly, i.e. they should have a half-life at 50°C of less than 10 hours. If only slowly decomposing initiators are used, the graft reaction of the monomers onto the protective colloids is too meagre and incrustation may occur. Suitable initiators are, for example, diacyl peroxides such as bis-($\alpha$-ethylhexanoyl) peroxide, peresters such as t-butyl perneodecanoate, percarbonates such as diisopropyl percarbonate and sulfonyl peroxides such as acetyl cyclohexanesulfonyl peroxide. Mixtures of these initiators with each other or with more slowly decomposing initiators such as lauroyl peroxide and azodiisobutyronitrile may be used. The rapidly decomposing initiators are preferably added to the polymerization mixture in amounts of from 0.005 to 0.100% w/w, based on the monomers.

The pH of the polymerziation mixture should be below 8, at least during the heat-up phase. Preferably, the pH is between 3 and 7. Thus no strongly alkaline buffering substances should be added to the polymerization mixture. This means that the hydrogen chloride formed during polymerization is not neutralized, but we have found that this is not detrimental to the thermal stability of the polymers. A relatively strong alkaline medium would decelerate the polymerization and, above all, hinder the graft polymerization of the monomers onto the protective colloids. This discovery contradicts previous views stating that the hydrogen chloride produced during polymerization increases the deposit of polymer scale on the reactor walls (cf. German Published Appln. No. 2,061,801, p. 2).

The entire polymerization cycle may be divided into two phases, viz. a heat-up phase and the actual polymerization phase. During the heat-up phase the polymerization mixture is heated to the desired polymerization temperature. This heat-up phase should not last longer than one third of the total duration of the polymerization cycle and preferably lasts from 0.5 to 4.0 hours. By polymerization cycle we mean, as usual, the duration from the commencement of heating of the reactor to the commencement of expansion of the unreacted monomers. During the heat-up phase, the temperature of the reactor wall may not exceed 20°C and preferably does not exceed 15°C above the temperature of the polymerization mixture. If possible, it should not exceed 80°C. If the temperature differential is too great or the wall temperature is too high, incrustation occurs on the reactor wall. One way of keeping below the maximum temperature differential is to heat up the water in the heating jacket at a slow rate. It is more convenient, however, to place only a portion, preferably from 20 to 50% (based on the total amount), of the suspension water in the reactor initially, together with at least a portion of the auxiliaries. The temperature of this water should not exceed 40°C. The remainder of the suspension water may be added at a temperature above the desired polymerization temperature. During such addition of hot water, the jacket temperature may be maintained at a constant level below the mixing temperature and then raised after completion of said water addition, although the condition of not exceeding 20°C above the temperature of the reaction mixture must still be complied with. By adding such hot suspension water, the heat-up phase is shortened to an economically acceptable duration.

Slight polymerization of the monomers occurs during the heat-up period. In addition, the monomers are graft-polymerized onto to the protective colloid, as mentioned above. The heat of polymerization thus generated and the heat applied through the reactor jacket cause the temperature of the polymerization mixture to rise. The actual polymerization phase is defined as commencing at the point at which the desired polymerization temperature is reached. During this polymerization phase, the temperature should remain substantially constant, i.e. it should not deviate from the desired temperature by more than 2°C and preferably not by more than 0.5°C. In order to make economical use of the cooling capacity of the reactor, the temperature of the reactor walls should be kept below the temperature of the reaction mixture during polymerization, i.e. the polymerization mixture is cooled by the reactor jacket. The jacket temperature necessary for said cooling may be obtained by the use of suitable temperature control units. In addition, heat may also be removed by conventional apparatus for cooling by evaporation.

In the following Examples the parts and percentages are by weight.

EXAMPLES

Description of Apparatus

The reactor use is a stainless steel vessel equipped with an impeller stirrer and finger baffles. The circulation of heating or cooling water is maintained by means of a circulating pump looped to the reactor jacket. Steam or cooling water is fed to the circulated water as required through the inlet pipe to the reactor jacket, controlled by a temperature regulator. The recycle water fed to the reactor jacket through the inlet pipe is fed to three inlets in order to achieve improved distribution thereof in the reactor jacket, these inlets being disposed vertically one above the other over the cylindrical part of the jacket to lead to the upper, middle and lower thirds of the reactor jacket respectively, the recycled water being caused to flow through nozzles in a direction tangential to the outer surface of the jacket and counter to the direction of rotation of the impeller. At the top of the reactor jacket there are two overflow outlets, each at a distance of one third of the jacket periphery from the said inlets, the circulated water passing through said overflows to the circulating pump.

COMPARATIVE EXAMPLE A

This Example illustrates the conventional procedure for suspension polymerization of vinyl chloride. In the reactor there are placed 4,500 parts of vinyl chloride, 7,500 parts of demineralized water, 2 parts of lauroyl peroxide, 0.6 part of acetyl cyclohexanesulfonyl peroxide, 80 parts of a 5% aqueous solution of a methyl hydroxypropylcellulose having a viscosity of 15 centipoise in 2% solution and 9 parts of ammonium carbonate. The reaction mixture has a temperature of 29°C. It is initially stirred for 20 minutes at a speed of 110 r.p.m. to achieve good distribution, whereupon it is heated to 72°C via the reactor jacket. The temperature differential between the reaction mixture and the heating jacket is on average 35°C and does not exceed 45°C during the heat-up period. The reaction mixture reaches the desired polymerization temperature of 72°C after 2 hours, at which stage the heat-up phase is complete and the actual polymerization phase begins. In order to remove the heat of polymerization and keep the temperature at a constant level, the temperature of the reactor jacket must be lowered to about 40°C. During polymerization, a pressure of 12 at. gage builds up at this temperature of 72°C. After polymerization commences, 1,800 parts of demineralized water at a temperature of 15°C is pumped into the reactor over 8 hours during the reaction in order to compensate for the contraction of the suspension caused by polymerization. After a polymerization time of 8.5 hours, the pressure begins to fall. When the pressure reaches 7 at gage, the suspension is degassed and then discharged, the internal surfaces of the reactor being rinsed clear of suspension residues with a jet of water issuing from the nozzle at almost zero pressure.

The internal surfaces of the vessel contacted by the suspension during polymerization are found to be coated with a thin paper-like film of polymer which is continuous except for those points which are opposite the inlets and outlets provided for the circulated water.

EXAMPLE 1

4,500 parts of vinyl chloride and 4,000 parts of demineralized water adjusted to pH 4 with hydrochloric acid, and parts of lauroyl peroxide, 0.2 part of diisopropyl percarbonate and the protective colloid system, described Comparative Example A are placed in the reactor. The polymerization mixture, which has a temperature of 21°C, is dispersed by stirring. The temperature of the jacket is then fixed at 30°C. 3,500 parts of condensed water produced in a previous PVC drying operation and having a temperature of 94°C are then pumped into the reaction miture over 30 minutes. As the temperature of the polymerization mixture rises above that of the reactor jacket, the temperature control unit begins to operate and the jacket temperature is regulated so as not to exceed the temperature of the reaction mixture by more than 20°C. On completion of the water addition, the contents of the reactor have a temperature of 56°C. After a further 1.5 hours, the polymerization temperature has reached 72°C. The cascade-type cooling control unit of the vessel jacket is then switched on to maintain isothermal conditions of operation and at the same time a steel pipe evaporative cooler attached to the dome of the vessel is put into operation. At the same tme, 1,800 parts of water having a temperature of 15°C are pumped into the reactor over a period of 4 hours to compensate for the contraction of the contents of the reactor. The pressure beings to drop after a polymerization time of 4.2 hours. After a further hour, when the pressure has dropped to 7 at gage, the suspension is degassed and discharged. The internal surfaces of the vessel are rinsed clear of suspension residues and are essentially free from incrustation. Very slight incrustation is seen to have formed over oval areas opposite the inlets and outlets of the reactor jacket. As the distance from the inlet increases, the thickness of the coating decreases until it disappears altogether. It is seen that an overall description of the incrustation in terms of units of weight per unit of surface area, as frequently employed in the literature, may be misleadng, since the degree of incrustation may vary locally to a considerable extent depending on the design and properties of the reactor.

COMPARATIVE EXAMPLE B

Exmaple 1 is repeated except that the initial water used is adjusted to pH 10.5 with 9 parts of ammonium carbonate. The polymerization time up to the point where the pressure has dropped by 5 atmospheres is 8.5 hours. After discharge of the suspension and rinsing, the internal surfaces of the reactor are seen to be coated as in Example 1 except that the spots of polymer incrustation are greater both in number and in size.

EXAMPLE 2

2,000 parts of demineralized water adjusted to pH 3 with hydrochloric acid, 4,500 parts of vinyl chloride, 80 parts of a 5% methylhydroxypropylcellulose having a viscosity of 15 centipoise in 2% aqueous solution, 9 parts of sorbitan monopalmitate, 1.35 parts of lauroyl peroxide, 0.67 part of t-butyl perpivalate and 0.5 part of acetyl cyclohexanesulfonyl peroxide are place in the reactor. The mixture is predispersed for 15 minutes with stirring at a temperature of 25°C. The temperature control apparatus is operated so that the temperature of the jacket does not exceed the internal temperature by more than 5°C during the heat-up phase. The reaction mixture is heated substantially by the addition of 5,500 parts of condensed water having a temperature of 92°C, over 1 hours. The reaction temperature is reached after 1.5 hours. Heat removal is now effected in the manner described in Example 1. Polymerization is complete after 5.3 hours. On discharge of the suspension and rinsing of the internal surfaces of the reactor with substantially non-pressurized water, the said surfaces are found to be completely free from incrustation.

COMPARATIVE EXAMPLE C

Example 2 is repeated except that the catalyst used is 2.0 parts of lauroyl peroxide with no addition of a rapidly decomposing initiator. The pressure beings to drop after a polymerization time of 80 hours. When the pressure has dropped to 7 at gage, the suspension is degassed and discharged.

After rinsing of the vessel walls, these are found to be continuously coated with a paper-like film of polymer similar to that found in Example A.

COMPARATIVE EXAMPLE D

Example 2 is repeated except that the procedure described in Comparative Example A is employed during the heat-up period. The temperature differential between the reaction mixture and the heating jecket is not more than 46°C and is 35°C on average. The reaction mixture has reached the desired temperature of 72°C after 2 hours. After a further 6 hours of polymerization, the suspension is degassed and discharged once the pressure has dropped to 7.0 at. gage. The reactor surfaces, after having been rinsed clear of suspension residues, are found to show spots as in Example B.

COMPARATIVE EXAMPLE E

Using an enameled reactor in place of the stainless steel reactor used in the previous Examples but of the same design, there are used 4,500 parts of vinyl cloride, 7,500 parts of dimineralized water which has been adjusted to pH 5 with sulfuric acid, 72 parts of a 5% aqueous solution of a polyvinyl acetate which is 75 mol% saponified and has a viscosity of 5 centipoise in 4% aqueous solution, 110 parts of a 2% aqueous solution of a methylhydroxypropylcellulose having a viscosity of 100 centipoises, 4.5 parts of sorbitan monopalmitate, 0.9 part of acetyl cyclohexanesulfonyl peroxide and 0.9 part of t-butyl perneodecanoate, and the resulting contents of the reactor are stirred for 10 minutes at 27°C. The reaction mixture is heated to 54°C over 1.5 hours via the reactor jacket. The temperature differential between the contents of the reactor and the reactor jacket reaches, during the heat-up phase, not more than 50°C and is 40° C on average. When the desired polymerization temperature of 54°C has been reached. The cooling measures described in the previous Examples are carried into effect and the reaction is carried out at a constant temperature of 54°C for 7 hours and is complete when the pressure has fallen by 3 at. gage. After discharge of the suspension and rinsing, the inside of the enameled reactor is found to be evenly coated with a thin paperlike film.

EXAMPLE 3

Comparative Example E is repeated except that only 3,500 parts of water are initially placed in the reactor, 4,000 parts of demineralized water having a temperature of 90°C being pumped into the reaction mixture having an initial temperature of 27°C, over 1 hours. During the addition of hot water, the temperature of the reactor jacket is maintained at not more than 5°C above the temperature of the reactor contents. Polymerization is completed in the manner described in Example 2. The rinsed internal surfaces of the reactor are free from incrustation.

EXAMPLE 4

Example 3 is repeated except that the reactor jacket is maintained at a constant temperature of 28°C while the hot water is being added. After the water addition over 1 hours, the polymerization mixture has a temperature of 43°C, this then being raised to the polymerization temperature of 54°C over 0.8 hour by external heating via the reactor jacket, the maximum temperature differential between said jacket and the contents of the reactor being 20°C. Polymerization is completed under the cooling conditions described previously until the pressure drops after 6.5 hours. After discharge of the suspension and rinsing of the internal surfaces of the reactor, the latter are found to be completely free from incrustation.

COMPARATIVE EXAMPLE F

Example 4 is repeated except that the initial water is not treated with sulfuric acid but is made alkaline with 45 parts of a 5% aqueous caustic soda solution. After a total polymerization time of 9.5 hours, the suspension is discharged and the internal surfaces of the reactor are rinsed free from suspension residues. The vessel wall is found to be coated with a continuous polymer film.

The following Table summarizes the most important results of the Examples of the invention and the Comparative Examples:

c. maintaining the temperature of the reactor walls above, by not more than 20°C, the temperature of the polymerization mixture during the heat-up phase and maintaining the temperature of the reactor walls below that of the polymerization mixture during the polymerization phase.

2. A process as claimed in claim 1 wherein the temperature of the reactor walls are maintained above, by not more than 15°C, the temperature of the polymerization mixture during the heat-up phase.

3. A process as claimed in claim 1 wherein said pH is in the range of 3 to 7.

4. A process as claimed in claim 3 wherein the amount of free-radical initiator (a) is present in the polymerization mixture in an amount of 0.005 to 0.100% w/w, based on the monomers.

5. A process as claimed in claim 1 wherein the amount of free-radical initiator (a) is present in the polymerization mixture in an amount of 0.005 to 0.100% w/w, based on the monomers.

TABLE

| Ex. | Maximum temperature differential† (°C) | Initial pH | Type of Catalyst | Duration of polymerisation cycle (hr) | Duration of polymerisation phase (hr) | Degree of grafting (%) | Incrustation |
|---|---|---|---|---|---|---|---|
| A | 46 | 10.5 | slow and rapid | 11.5 | 9.5 | 24 | thick film |
| 1 | 20 | 4.0 | " | 7.2 | 5.2 | 34 | very slight |
| B | 19 | 10.5 | " | 10.5 | 8.5 | 26 | thin film |
| 2 | 5 | 3.0 | " | 6.8 | 5.3 | 48 | none |
| C | 5 | 3.0 | " | 11.0 | 9.5 | 25 | thick film |
| D | 46 | 3.0 | " | 8.0 | 6.0 | 36 | thin film |
| E | 50 | 5.0 | " | 8.5 | 7.0 | 43 | thick film |
| 3 | 5 | 5.0 | " | 8.2 | 7.2 | 38 | none |
| 4 | 20 | 5.0 | " | 8.3 | 6.5 | 46 | none |
| F | 5 | 11.0 | " | 11.3 | 9.5 | 23 | thick film |

†between the reaction mixture and the reactor jacket

We claim:
1. A process for the polymerization of vinyl chloride or vinyl chloride and up to 30% by weight of conventional comonomers in aqueous suspension in the presence of a free-radical initiator and a water-soluble protective colloid in a stirred reactor, wherein the polymerization mixture is heated to the desired polymerization temperature in a heat-up phase which constitutes not more than one third of the time required for the full polymerization cycle, whereupon polymerization is carried out in the polymerization phase at a substantially constant temperature, which process comprises
   a. using at least one free-radical initiator having a half-life at 50°C of less than 10 hours,
   b. maintaining the polymerization mixture at a pH of less than 8 during the heat-up phase, and

6. A process as claimed in claim 5 wherein said free-radical initiator (a) includes at least one member selected from the group consisting of bis-(α-ethylhexanoyl) peroxide, t-butyl perneodecanoate, diisopropyl percarbonate and acetyl cyclohexanesulfonyl peroxide.

7. A process as claimed in claim 6 wherein the free-radical initiator (a) is employed together with a more slowly decomposing initiator selected from the group consisting of lauroyl peroxide and azodiisobutyronitrile.

8. A process as claimed in claim 1 wherein the free-radical initiator (a) is employed together with a more slowly decomposing initiator selected from the group consisting of lauroyl peroxide azodiisobutyronitrile.

* * * * *

UNITED STATES PATENT AND TRADEMARK OFFICE
CERTIFICATE OF CORRECTION

PATENT NO. : 3,957,744
DATED : May 18, 1976
INVENTOR(S) : DEUSCHEL et al

It is certified that error appears in the above-identified patent and that said Letters Patent are hereby corrected as shown below:

In Column 2, Line 9, delete "polyvnyl" and substitute --polyvinyl--

In Column 2, Line 24, delete " of Water " and substitute -- of water --

In Column 4, Line 42, delete " 7 at " and substitute -- 7 at.--

In Column 4, Line 56, delete " parts of lauroyl " and substitute -- 2 parts of lauroyl --

In Column 4, Line 64, delete " miture " and substitute -- mixture --

In Column 5, Line 30, delete " Exmaple 1 " and substitue -- Example 1 --

Signed and Sealed this

Nineteenth Day of April 1977

[SEAL]

Attest:

RUTH C. MASON
Attesting Officer

C. MARSHALL DANN
Commissioner of Patents and Trademarks